UNITED STATES PATENT OFFICE.

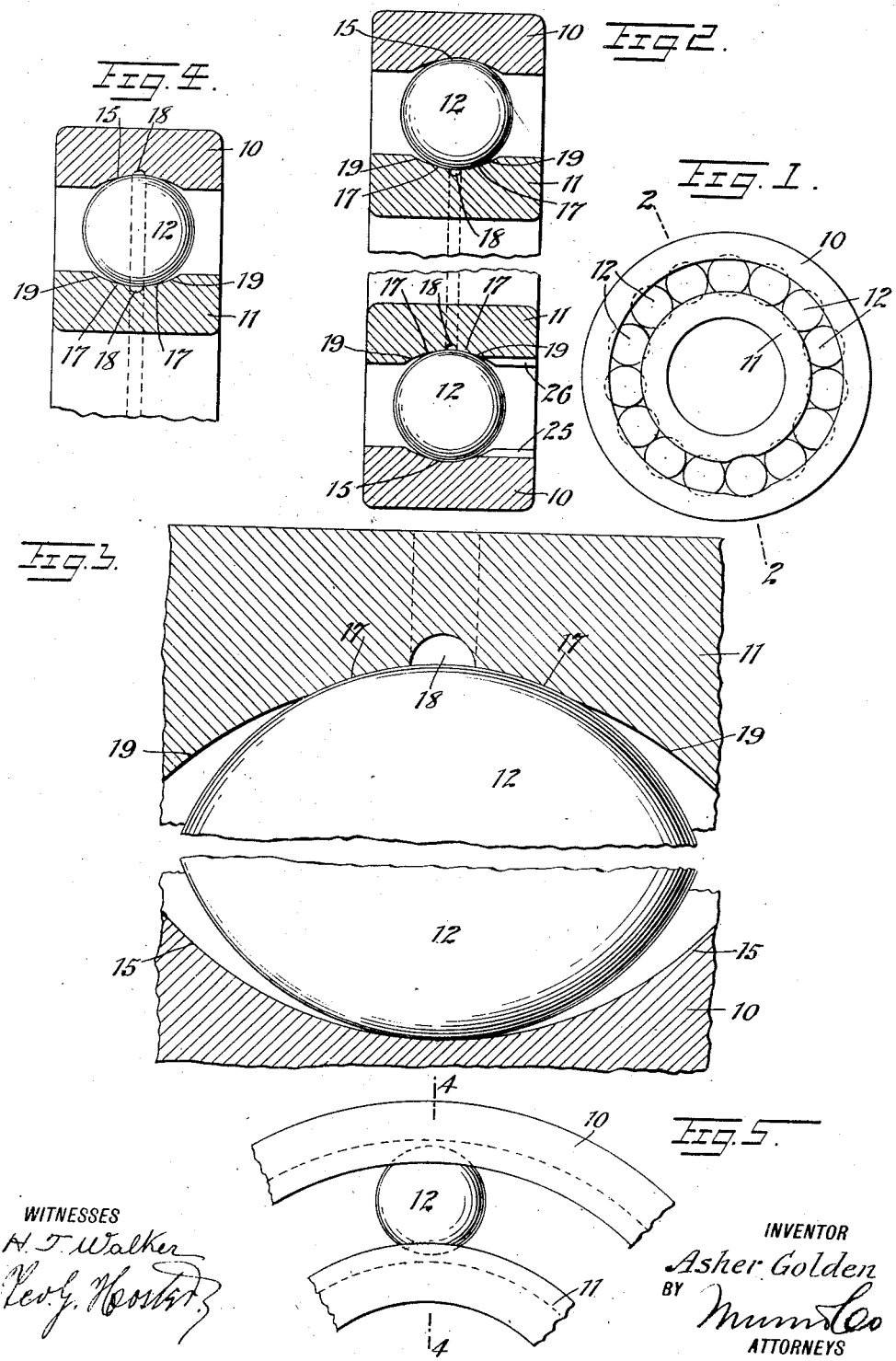
A. GOLDEN.
BALL BEARING.
APPLICATION FILED JULY 28, 1919.
1,356,444.
Patented Oct. 19, 1920.
INVENTOR
Asher Golden

ASHER GOLDEN, OF NEW YORK, N. Y.

BALL-BEARING.

1,356,444.  Specification of Letters Patent.  Patented Oct. 19, 1920.

Application filed July 28, 1919. Serial No. 313,755.

*To all whom it may concern:*

Be it known that I, ASHER GOLDEN, a citizen of the United States, and a resident of the city of New York, borough of the Bronx, in the county of Bronx and State of New York, have invented a new and Improved Ball-Bearing, of which the following is a full, clear, and exact description.

The object of the invention is to provide a new and improved ball bearing arranged to provide sufficient bearing surface to sustain the load without danger of injury to the raceway or the bearing balls and at the same time preventing binding of the balls in the raceway. Another object is to provide a simple means for keeping the ball bearings properly lubricated.

With these and other objects in view, the invention consists of certain novel features of construction as hereinafter shown and described and then specifically pointed out in the claims.

A practical embodiment of the invention is represented in the accompanying drawings forming a part of this specification, in which similar characters of reference indicate corresponding parts in all the views.

Figure 1 is a reduced face view of the improved ball bearing;

Fig. 2 is a cross section of the same on the line 2—2 of Fig. 1;

Fig. 3 is an enlarged cross section of a portion of the same;

Fig. 4 is a cross section of a modified form of the ball bearing, the section being on the line 4—4 of Fig. 5; and Fig. 5 is a face view of a portion of the same.

The ball bearing illustrated in Figs. 1, 2 and 3 consists essentially of an outer bearing ring 10, an inner bearing ring 11 and an annular row of bearing balls 12 interposed between the rings 10 and 11. The outer ring 10 is provided with an annular segmental contact groove 15 in point contact with the bearing balls 12, said groove 15 being formed with a greater curvature than the balls to provide a relief for the same with a view to prevent binding. It is understood that the segmental grooves 15 are struck from a center greater than the radius of the bearing ball 12. The inner ring 11 is likewise provided with a central segmental contact groove 17 in line contact with the bearing balls 12, but this groove 17 is intersected at its middle by a central annular relief groove 18 forming an oil well for containing a lubricant. It is understood that the segmental grooves 17 are struck from a center coinciding with the center of a bearing ball 12 while the relief grooves 19 have a radius in excess of that of a bearing ball 12. This arrangement provides a relief for the bearing balls and consequently prevents any considerable binding action. It will be noticed that by this arrangement the bearing balls 12 are relieved at the groove 18 and at the side grooves 19 of the inner ring 11 to prevent binding of the bearing balls on the inner ring, at the same time providing sufficient contact surface at both the inner and outer rings to sustain the load properly without danger of injury to the raceway or the balls.

It is to be understood that the central relief groove 18 is preferably formed in the inner ring 11 owing to the ease with which such grooves can be formed on a lathe in the inner ring 11, but, if desired, both the inner and outer rings may be provided with such central relief groove 18, as illustrated in Figs. 4 and 5. As the construction of this modified form is otherwise the same it is not deemed necessary to further describe the same, it being understood, however, that the segmental contact portion 15 is intersected by the relief groove 18.

The inner and outer rings 10 and 11 may be provided with filling slots 25 and 26 for conveniently inserting the bearing balls 12 into the raceway formed by the grooves 15 and 17. It is understood that the filling slots 25 and 26 are not the full depth of the contacting grooves 15 and 17 to prevent the bearing balls 12 from falling out of the raceway after the parts are assembled.

Having thus described my invention, I claim as new and desire to secure by Letters Patent:—

1. A ball bearing comprising inner and outer race members provided with opposed raceway grooves and a plurality of balls operating in said grooves, one of said raceway grooves having a central zone the transverse curvature of which is the same as the curvature of the coöperating balls, and relief grooves at each side of said central zone, the transverse curvature of said relief grooves being greater than the curvature of the balls, and the opposing raceway being a continuous arc the transverse curvature of which is greater than the curvature of the balls.

2. A ball bearing comprising inner and outer race members provided with opposed raceway grooves, and a plurality of balls operating in said grooves, one of said raceway grooves having a central zone the transverse curvature of which is the same as the curvature of the coöperating balls, and relief grooves at each side of said zone, the said central zone having an annular relief groove including the transverse center of the central zone, the opposed raceway groove having a transverse curvature greater than that of the coöperating balls.

3. A ball bearing comprising inner and outer race members provided with opposed raceway grooves, and a plurality of balls operating in said grooves, the groove of the inner member including a central zone the transverse curvature of which is the same as the coöperating ball, an annular relief and lubricating groove at the transverse center of said zone, and arcuate relief grooves at each side of the said central zone, the curvature of said relief grooves being greater than that of the balls, the opposed raceway groove having a greater curvature than that of the balls, and having an annular relief and lubricating groove at the transverse center thereof.

4. In a ball bearing, an annular row of bearing balls and two single-piece concentric annular bearing members provided on their opposite faces with arcuate annular grooves forming a raceway between them for the said bearing balls, each of the said grooves having a segmental contact portion in line contact with the said balls, and a dished annular relief groove in at least one of the said members, disposed centrally and intersecting the corresponding segmental contacting portion, the said relief groove also constituting a lubricant groove.

ASHER GOLDEN.